United States Patent [19]

Hayashi et al.

[11] Patent Number: 4,710,266

[45] Date of Patent: Dec. 1, 1987

[54] APPARATUS FOR SUBJECTING A RADIOACTIVE SODIUM BORATE WASTE SOLUTION TO VOLUME REDUCTION AND SOLIDIFICATION

[75] Inventors: Tadamasa Hayashi; Toyoshi Mizushima, both of Kanagawa, Japan

[73] Assignee: Ebara Corporation, Tokyo, Japan

[21] Appl. No.: 841,036

[22] Filed: Mar. 20, 1986

Related U.S. Application Data

[63] Continuation of Ser. No. 639,114, Aug. 9, 1984, abandoned.

[30] Foreign Application Priority Data

Aug. 9, 1983 [JP] Japan ................................. 58-144452

[51] Int. Cl.$^4$ .......................... B01D 1/22; G21F 9/08; G21F 9/16
[52] U.S. Cl. ..................................... 159/7; 159/25.1; 159/DIG. 12; 422/159; 422/903; 252/629; 219/10.55 A
[58] Field of Search .............. 159/5, 7, 25.1, DIG. 12; 252/628, 629, 632; 219/10.55 R, 10.55 A; 65/144; 55/DIG. 9; 422/159, 903

[56] References Cited

U.S. PATENT DOCUMENTS

| | | | |
|---|---|---|---|
| 4,221,680 | 9/1980 | Hardwick et al. | 252/626 |
| 4,341,915 | 7/1982 | Adachi et al. | 252/632 X |
| 4,344,872 | 8/1982 | Thiele | 252/629 |
| 4,409,137 | 10/1983 | Mergan et al. | 252/632 |
| 4,452,733 | 6/1984 | Horiuchi et al. | 252/632 |

FOREIGN PATENT DOCUMENTS

| | | |
|---|---|---|
| 2734147 | 2/1978 | Fed. Rep. of Germany . |
| 3045878 | 10/1982 | Fed. Rep. of Germany . |
| 55-9111 | 1/1980 | Japan . |
| 55-121897 | 9/1980 | Japan . |
| 58-127199 | 10/1980 | Japan . |
| 158998 | 12/1981 | Japan . |
| 57-28298 | 2/1982 | Japan . |
| 30000 | 2/1982 | Japan . |
| 57-71825 | 5/1982 | Japan . |
| 57-56040 | 11/1982 | Japan . |
| 57-60073 | 12/1982 | Japan . |
| 58-7599 | 1/1983 | Japan . |
| 58-17398 | 2/1983 | Japan . |
| 58-22280 | 5/1983 | Japan . |
| 58-24385 | 5/1983 | Japan . |
| 58-168997 | 10/1983 | Japan . |
| 58-204395 | 11/1983 | Japan . |

OTHER PUBLICATIONS

Odoj, "Glas als Werkstoff zur Beseitigung Radioaktier Abfälle", Sprechsal 113, Jahrgang, Heft 5/80, pp. 345–350.
Heimerl et al., "Chemical and Technological Aspects of the Vitrification of High Level Radioactive Wastes", Kerntechnik 18, Jahrgang (1976), No. 6, pp. 272–277.
Preprint G 46 (Oct. 1978) of 1978 Fall Meeting of Atomic Energy Society of Japan.
Summary Report J 39 (Mar. 1979) of 1979 Annual Meeting (17th) of Atomic Energy Society of Japan.
Preprint F 74 (Oct. 1979) of Fall Meeting of Atomic Energy Society of Japan.

(List continued on next page.)

Primary Examiner—S. Leon Bashore
Assistant Examiner—Andrew J. Anderson
Attorney, Agent, or Firm—Oblon, Fisher, Spivak, McClelland, & Maier

[57] ABSTRACT

An apparatus is disclosed for producing a vitric solid solution comprising mainly the solid content of a radioactive waste solution of sodium borate discharged from a pressurized water reactor, the apparatus comprising a waste solution feed tank equipped with a hopper for stabilizing agent in water, a thin film evaporator, a heating type dehydrator, a powder drier connected with a microwave generator through a microwave guide tube and equipped with a stirrer, and a melting furnace connected with a microwave generator through a microwave guide tube, the above units being combined by pipes or a powder-transferring means.

4 Claims, 17 Drawing Figures

OTHER PUBLICATIONS

Preprint, p. 58 (Oct. 1980) of 13th Reporting and Lecture Meeting of Power Reactor and Nuclear Fuel Development Corporation.
Preprint G 47 (Oct. 1979) of 1979 Fall Meeting of Atomic Energy Society of Japan.
Summary Report F 31 of 1981 Annual Meeting of Atomic Energy Society of Japan.
Preprint F-9 of the Fall Meeting, 1980 of the Atomic Energy Society of Japan.
Glass Handbook 3.2.4 Borosilicate Glass.
JAERI-M 82-007, "Corrosion Resistance of Metal Materials for HLW Canister", Furuya et al., 2/82.
"The Invention", vol. 80, No. 5, pp. 58–62.
Summary Report F 25 of 1978 Annual Meeting of Atomic Energy Society of Japan (Mar. 1978).
Summary Report J 37 (Mar. 1979) of 1979 Annual Meeting (17th) of Atomic Energy Society of Japan.
Kobe Steel Technical Report, vol. 33, No. 1, pp. 35–38.

APPARATUS FOR SUBJECTING A RADIOACTIVE SODIUM BORATE WASTE SOLUTION TO VOLUME REDUCTION AND SOLIDIFICATION

This application is a continuation of application Ser. No. 639,114, filed Aug. 9, 1984, now abandoned.

BACKGROUND OF THE INVENTION

1. Field of the Invention

This invention relates to (1) a process for volume reduction and solidification of a radioactive waste solution mainly composed of sodium borate and discharged from a pressurized water reactor (hereinunder abbreviated as "PWR"), which comprises adding, to said radioactive waste solution or its concentrate or the dried material of the concentrate, ZnO or a mixture of ZnO with $Al_2O_3$ and/or CaO, and then subjecting the resulting mixture to dehydration and melting by heating to produce a vitric solid solution composed mainly of $Na_2O$-$B_2O_3$-$ZnO$, (2) a vitric solid solution produced by said process, and (3) an apparatus for producing said vitric solid solution.

2. Description of Prior Art

As processes for solidification of sodium borate waste solutions discharged from PWRs, there have hitherto been used the cement solidification process and the bituminization process.

In the cement solidification process, water in waste solution remains in solidified wastes and accordingly these solidified wastes have volumes larger than the original waste solutions. In the bituminization process, firstly water is removed by evaporation from waste waters and then molten bitumen is added to the evaporation residues to solidify the residues. Therefore, the bituminization process is fairly effective in volume reduction and has been employed at many PWR plants.

Solidification of radioactive wastes has been conducted on the assumption that solidified wastes can in some cases be dumped into the ocean. However, ocean dumping of solidified wastes is becoming increasingly prohibitive and also their inland disposal or underground burial is difficult to realize in countries without vast disposal sites. For these reasons, solidified radioactive wastes are compelled to be stored within the site of nuclear power stations over a very long period of time. Since each site has a limitation in available space, a solidification process which is more effective in volume reduction than the conventional solidification processes is required.

Presently, in the bituminization process for PWR sodium borate waste solutions, a solidified waste is produced so that the solid content, apart from asphalt, in the solidified waste becomes about 40% by weight. If the content of solid material other than asphalt could be increased to 60% by weight, the effect of volume reduction becomes larger. This comparison is illustrated more intelligibly in FIGS. 1 and 2, wherein the solidified waste of 40% solid content and that of 60% solid content are compared on the basis of volume. FIGS. 1 and 2 each illustrate a flow diagram of solidified waste production by using the volume of the total solid content of a concentrated waste solution supplied and the volume of asphalt. FIG. 1 shows the case of production of a solidified waste of 40% solid content and FIG. 2 shows the case of production of a solidified waste of 60% solid content. In each case, the concentrated waste solution supplied had a boron concentration of 20,000 to 21,000 ppm and a total solid concentration of about 10%, and the sodium borate in the concentrated waste solution had a density of about 2.36.

Even if the solid content, without asphalt, in the above solidified waste could be increased to 60% by weight, problems would still exist. That is, the volume of asphalt as a binder relative to the solid content of the concentrated waste solution composed mainly of sodium borate crystal occupies more than 50% of the volume of the solidified waste, and, further, the extent of swelling of the solidified waste in water can not be ignored and addition of anti-swelling agents such as CaO or BaO becomes necessary.

The plastic solidification process is also proposed. In this process, the solid content without plastic in solidified waste is reported to be roughly 60% by weight. However, a large amount of an additive such as Ca is said to be required at the time of solidification of sodium borate waste solution.

Asphalt has a relatively low flash point. Plastics are organic substances though some of them have high flash points. Hence, neither asphalt nor plastics are sufficiently free from the risk of fire occurring during their transportation in the form of solidified waste as a result of vehicle collision, etc. From the standpoint of fire safety, solidification of radioactive waste solutions by the use of an inorganic substance is desirable.

Based on the thinking that the effect of volume reduction is enhanced if asphalt or a plastic as a binder is removed, a process was developed for volume reduction of sodium borate water solution by roasting or calcinating a sodium borate waste solution on a fluid bed of a temperature of several hundreds degrees centigrade, as described in Japanese Patent Laid-open Publication No. 158998/1981 and Japanese Patent Laid-open Publication No. 30000/1982. However, calcinated sodium borate must be protected from moisture or water penetration during storage, and therefore it can not be disposed of as it is.

It is known that sodium borate, regardless of whether it is radioactive or not, is very easily converted to a vitric substance when it is melted by itself. By varying a $Na_2O$ to $B_2O_3$ ratio, vitric substances of various compositions are formed and all these substances are readily soluble in water.

Besides this, as a solidification process using boric acid as a solidifying material, there is a solidification-in-borosilicate-glass process which is intended to be used as a solidification process for highly radioactive waste solutions from nuclear fuel reprocessing plants. (New Technologies Viewed from Patents—16, in 1983 May issue of "Invention").

The above borosilicate glass process can provide safe solidified wastes but it is not desirable in terms of volume reduction of PWR sodium borate waste solution.

In Table 1 are shown examples of compositions of borosilicate glasses generally known in Japan. The table was summarized based on the publications listed on the page following Table 1.

TABLE 1

Compositions of Solidified Borosilicate Glass Wastes Experimentally
Produced by Power Reactor and Nuclear Fuel Development Corporation
and Japan Atomic Energy Research Institute

| Glass component % by wt. | Basic composition for engineering tests | | Reprocessing at Power Reactor and Nuclear Fuel Development Corporation | | | | | | | Japan Atomic Energy Research Institute |
|---|---|---|---|---|---|---|---|---|---|---|
| | Range | Standard | Glass composition: G-2 | | | | GB-1 | | GB-4 | |
| | | | (1) | (2) | (3) | (4) | (1) | (2) | | |
| $SiO_2$ | 35 to 45 | 43 | 43 | 43 | 43.9 | 43.0 | 53.4 | 54.7 | 50.5 | 27.0 |
| $B_2O_3$ | 10 to 18 | 14 | 14 | 14 | 14.3 | 9.4 | 9.4 | 9.6 | 13.4 | 30.3 |
| $Al_2O_3$ | to 5 | 4 | 4 | 4 | 4.1 | 3.5 | 4.9 | 5.0 | 5.3 | — |
| $Na_2O$ | 9 to 12 | 10 | 10 | 10 | 9.98 | 10.18 | 10.18 | 10.18 | 11.18 | 12.5 |
| $K_2O$ | to 4 | 2 | 2 | 2 | 2.0 | 2.0 | — | — | — | |
| $Li_2O$ | 2 to 5 | 3 | 3 | 3 | 3.1 | 3.0 | 1.9 | 1.0 | 1.0 | — |
| CaO | to 3 | 2 | 2 | 2 | 2.0 | 2.0 | — | — | — | 1.7 |
| ZnO | to 8 | 2 | 2 | 2 | 2.0 | 2.0 | — | — | — | — |
| $Fe_2O_3$ | — | — | — | — | — | 0.97 | 0.97 | — | — | — |
| $Cr_2O_3$ | — | — | — | — | — | 0.17 | 0.17 | — | — | — |
| NiO | — | — | — | — | — | 0.12 | 0.12 | — | — | — |
| F.P. oxide | 20 | 20 | 20 | 20 | 18.7 | 19.1 | 19.1 | 19.5 | 18.6 | 28.5 |
| Publication | (1) | | (2) | (3) | (4), (5) | (6) | (6) | (4), (5) | | (7) |

Publication:
(1) Summary Report F 25 (March, 1978), of 1978 Annual Meeting of Atomic Energy Society of Japan
(2) Preprint G 46 (October, 1978), of 1978 Fall Meeting of Atomic Energy Society of Japan
(3) Summary Report J 37 (March, 1979), of 1979 Annual Meeting (17th) of Atomic Energy Society of Japan
(4) Summary Report J 39 (March, 1979), of 1979 Annual Meeting (17th) of Atomic Energy Society of Japan
(5) Preprint F 74 (October, 1979), of 1979 Fall Meeting of Atomic Energy Society of Japan
(6) Preprint P 58 (October, 1980), of 13th Reporting and Lecture Meeting of Power Reactor and Nuclear Fuel Development Corporation
(7) Perprint G 47 (October, 1978), of 1978 Fall Meeting of Atomic Energy Society of Japan
Note:
According to the Power Reactor and Nuclear Fuel Development Corporation, leaching rates, etc. of various borosilicate glass wastes were evaluated by 1978 and, as a result, G-2 was selected as a satisfactory composition; the effects of CaO and ZnO on leaching rate were not conspicuous but BaO and $TiO_2$ were very effective with addition of only a small quantity. (Summary Report F 31 of 1981 Annual Meeting of Atomic Energy Society of Japan)

The glass composition G-2 in Table 1 is regarded as a typical composition of borosilicate glass solidified wastes to be produced at Japanese nuclear fuel-reprocessing plants. As is obvious from Table 1, in G-2, $SiO_2$ is roughly about 50% by weight, $B_2O_3$ is about 14% by weight and $Na_2O$ is as low as about 10% by weight. Hence, if a vitric solidified waste of the same composition as that of G-2 is actually produced from a PWR sodium borate waste solution, the vitric solidified waste is very poor in volume reduction effect.

FIG. 3 is a three component systems diagram showing compositions of borosilicate glass frits, of presently known waste solutions from reprocessing of nuclear fuels. In these frits, including those being used in U.S.A. and other foreign countries, the respective contents of $B_2O_3$ and $Na_2O$ are very low while the content of $SiO_2$ is high. For comparison, there is also shown in FIG. 3 a composition of a $Na_2O$-$B_2O_3$-ZnO type (free from $SiO_2$) vitric solidified waste frit of the present invention. Incidentally, FIG. 3 has been taken from "Preprint F 9" of the Fall Meeting, 1980 of the Atomic Energy Society of Japan.

In the section on borosilicate glass of "3.2 Vitrification of Radioactive Wastes" of the Glass Handbook, there is shown a borosilicate glass produced in West Germany which contains boric acid and sodium in fairly high quantities, namely, 17 to 20 mole % of $B_2O_3$ and 10 to 25 mole % of $Na_2O$. However, containing a large quantity of $SiO_2$, the borosilicate glass is not fully satisfactory in volume reduction effect.

SUMMARY OF THE INVENTION

It is an object of the invention, therefore, to provide a greatly volume-reduced solid from a PWR sodium borate waste solution, a process for producing said solid and an apparatus for producing said solid.

It is another object of the invention to provide a safe and stable solid from a PWR sodium borate waste solution, a safe and reliable process for producing said solid and a safe and reliable apparatus for producing said solid.

Other objects and advantages of the present invention may become apparent to those skilled in the art from the following description and the figures.

DETAILED DESCRIPTION OF THE PREFERRED EMBOIDMENT

Figure 1:
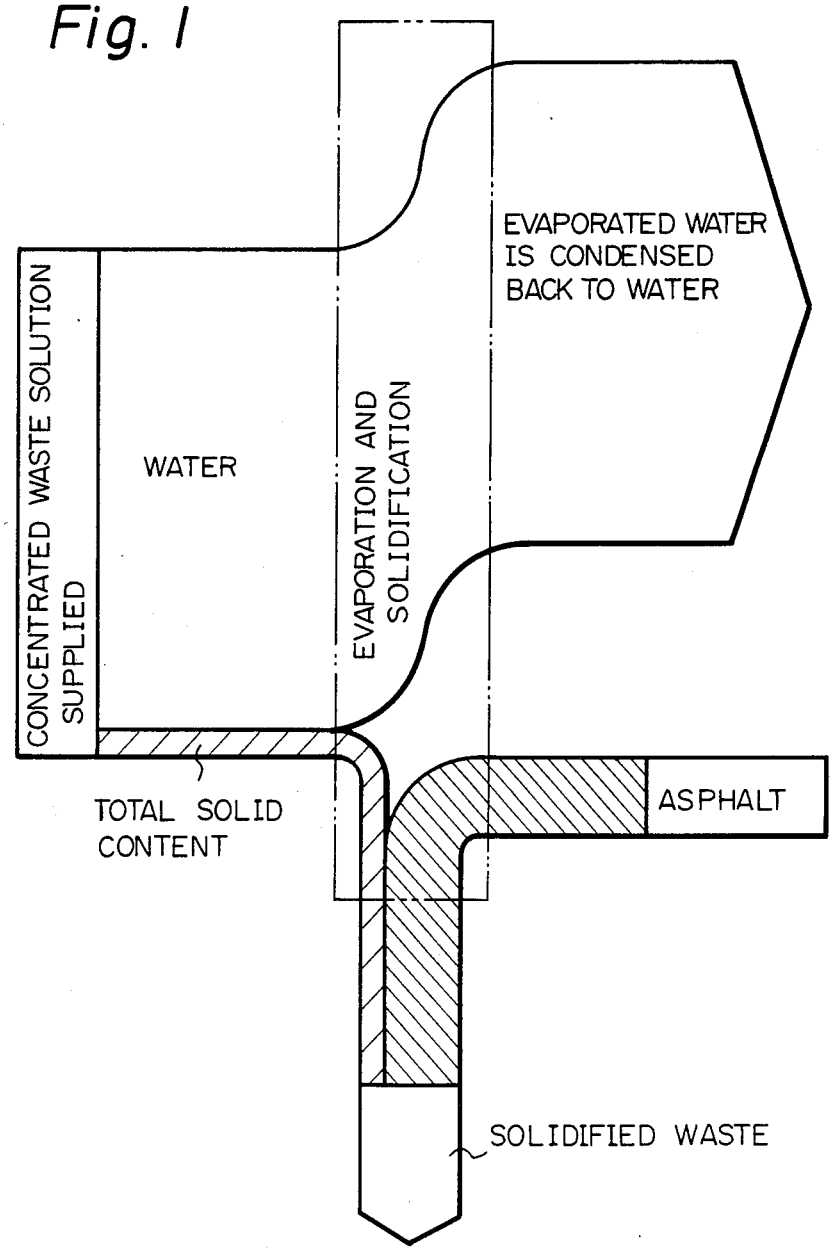
FIGS. 1 and 2 are drawings each showing the volume-reduction effect according to the conventional bituminization process.
Figure 2:
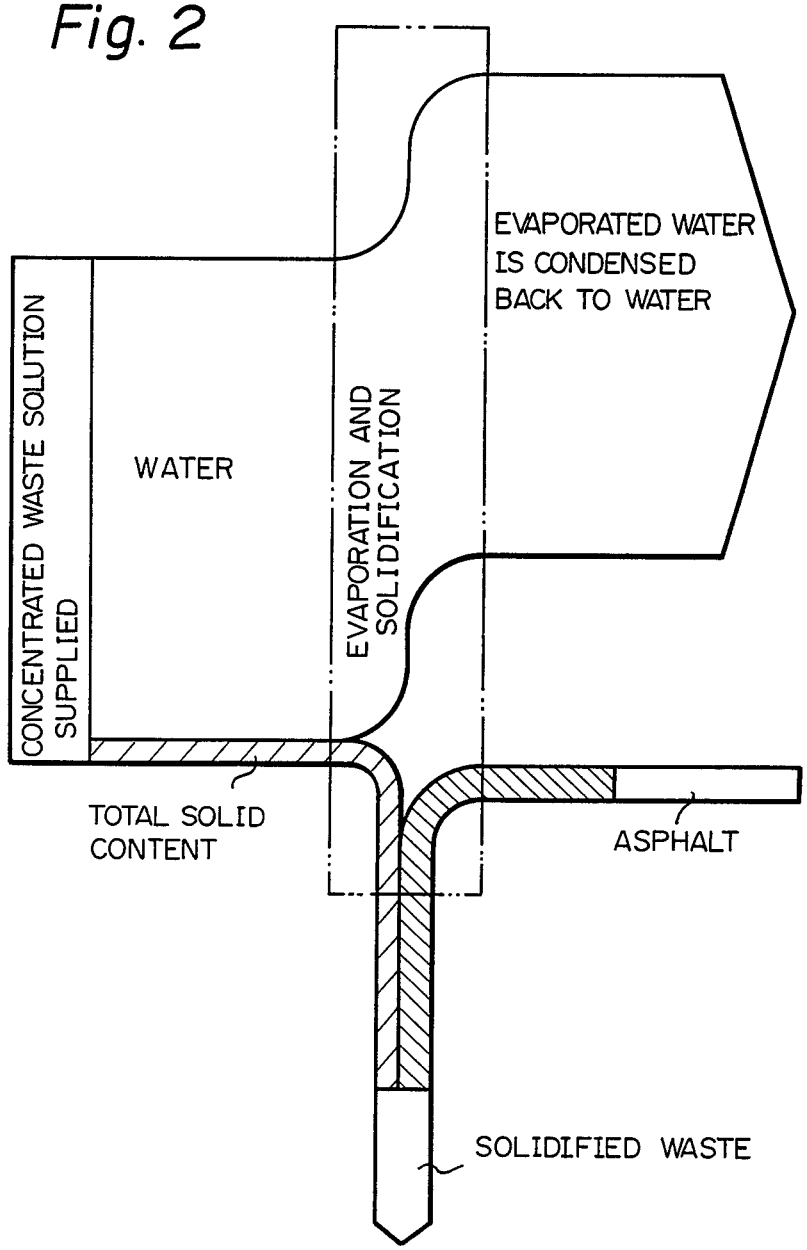

The present invention relates to (1) a vitric solid solution which comprises (a) the solid content of a radioactive waste solution of sodium borate discharged from a pressurized water reactor, having a $Na_2O$ to $B_2O_3$ molar ratio of 0.10 to 0.60 and (b) ZnO or a mixture of ZnO with $Al_2O_3$ and/or CaO, so that the ZnO content in the vitric solid solution is 10 to 40 mole %, or the ZnO content is 10 to 40 mole % and the content of $Al_2O_3$ and/or CaO is 3 to 10 mole % and the total content of ZnO plus $Al_2O_3$ and/or CaO does not exceed 43 mole %, (2) a process for producing said vitric solid solution, and (3) an apparatus for producing said vitric solid solution.

The present inventors found that (1) concentrates of waste solutions composed mainly of sodium borate and discharged from PWRs contain sodium and boron in a sodium to boron molar ratio very suitable for forming a three components or four components vitric substance using sodium, boron and a third component (ZnO or a mixture of ZnO with $Al_2O_3$ and/or CaO), (2) said vitric substance has a low solubility in water, is formed even when the third component is added in a relatively small quantity and has a markedly reduced volume compared with the volume of the original waste solution concentrate, and (3) a mixture of (a) sodium borate and (b) ZnO or a mixture of ZnO with $Al_2O_3$ and/or CaO well absorbs a micro-wave and accordingly can easily be converted to a vitric substance by micro-wave heating. Based on these findings, the present inventors invented a process for producing a greatly volume-reduced radioactive vitric solid from a PWR sodium borate waste solution which comprises adding, to said waste solution, ZnO or an inorganic zinc compound capable of producing ZnO when melted or a mixture of ZnO or said inorganic zinc compound with $Al_2O_3$ and/or CaO and exposing the resulting mixture to a micro-wave, as well as an apparatus for producing said vitric solid. In this way, the present invention has been accomplished.

PWR sodium borate solutions which are subjected to solidification treatment in the present invention have properties of the fairly narrow Na/B molar range, which is suitable for said vitrification. The boron content in these waste solutions as measured at a temperature of 75°±5° C. is 20,000 to 21,000 ppm as boron and the pH as measured at the same temperature is about 8.5±0.5.

The total solid content in waste solution is about 10±2% by weight although it may slightly vary depending upon the quantity of a sodium compound used to neutralize the waste solution. The total solid content is mainly composed of sodium borate and besides contains about several hundred ppm of $SO_4^{--}$ and $Cl^-$ as well as 100 ppm or less of $PO_4^{---}$, $Li^+$ and a solid suspension. Therefore, waste solutions are substantially close to a concentrated aqueous solution of weak alkalinity wherein orthoboric acid and sodium hydroxide are dissolved.

With regard to aqueous sodium borate solutions each having a boron concentration of about 21,000 ppm, the relation between molar ratio of sodium to boron and pH was studied. It was found that a definite relation existed. The relation is shown in FIG. 5.

Figure 5:
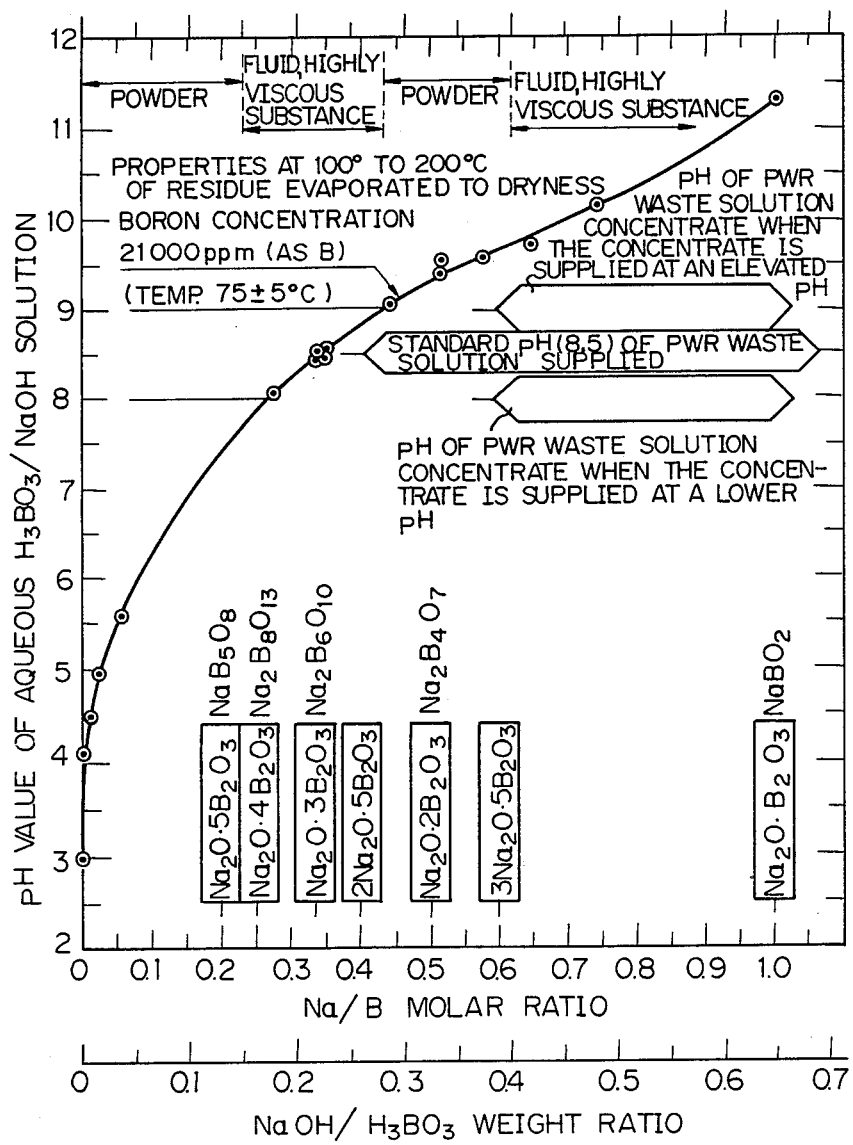
FIG. 5 is a drawing showing a relation between pH and Na/B molar ratio, of aqueous sodium borate solutions.

In FIG. 5, the ordinate is the pH value of an aqueous solution containing $H_3BO_3$ and NaOH; the abscissa is Na/B molar ratio or $NaOH/H_3BO_3$ weight ratio; and a relation between pH and sodium borate composition of sodium borate solutions each having a boron concentration of 21,000 ppm is shown. Further in FIG. 5, there appear properties at 100° to 200° C. of sodium borates of various Na/B molar ratios, each evaporated to dryness.

As is obvious from FIG. 5, in the pH range of 8.0 to 9.0, Na/B molar ratio is about 0.27 to 0.43; in the pH range of 7.0 to 9.5, Na/B molar ratio is about 0.15 to 0.56; and a higher pH gives a larger Na/B molar ratio.

Sodium borate waste solutions discharged from PWRs are firstly subjected to preliminary concentration and then transferred to a solidification system, where an evaporation apparatus, a transfer tank, pumps, pipes, valves, etc. are mainly made of stainless steel. In order to prevent corrosion of these stainless steels, sodium hydroxide, sodium carbonate or the like is added to the above waste solutions to make their pHs neutral to alkaline. Accordingly, these waste solutions for transfer to the solidification apparatus after preliminary concentration vary in pH from 7.0 to 9.5 depending upon batch. However, when these concentrated gradually discharged waste solutions are stored in a concentrate receiving tank, they show less fluctuation in the pH value which results in the range of about 8.0 to 9.0 though the inflowing wastes which are transferred batchwise show a pH fluctuation of from 7.0 to 9.0.

In the course of studies to develop a process for solidifying sodium borate waste solutions discharged from PWRs with a large volume reduction effect, the present inventors found the following fact.

In the section appearing in pages 883 to 901 of Glass Handbook compiled by Sakka, Sakaino and Takahashi (published in 1975 by Asakura Publishing Co., Ltd.), there is shown a vitrification region of three component systems each using $B_2O_3$ as a first component, $Na_2O$ as a second component and another metal oxide as a third component. As a result of comparison between the above vitrification region and the Na/B molar ratio of an aqueous sodium borate solution of FIG. 5, the present inventors found that, when the third component is $SiO_2$, $Al_2O_3$, BeO, PbO, ZnO, $Bi_2O_3$, $Li_2O$, $ZrO_2$, $TiO_2$, CuO, CaO or MgO, vitrification of the aqueous sodium borate solution is achievable at a Na/B molar ratio of 0.6 (namely, $3Na_2O.5B_2O_3$) or smaller. That is, the present inventors found that all sodium borate waste solutions of pH 9.6 or less can be vitrified in three components systems using one of the above metal oxides as a third component.

In facilities where radioactive wastes are handled, it is desirable that as few pieces of equipment and instruments as possible are installed inside radiation-shielding walls to minimize the radiation dose rate of the personnel during maintenance work. For this reason, remote microwave heating through wave guide is desirable because it enables installation of a heat source outside the shielding walls as well as elimination of a heating surface which might radioactively be contaminated.

Our investigation confirmed that the above-mentioned three component glass frit, $Na_2O$ and $B_2O_3$ will absorb a microwave of 915 to 2,450 MHz and thereby are heated, quickly.

Three component glasses each using $SiO_2$, $Al_2O_3$, PbO, ZnO, $ZrO_2$, $TiO_2$, CuO, CaO or MgO as a third component (these third components were selected on the basis of usuability at atomic power plants and availability) as well as $Na_2O$-$B_2O_3$ two component glasses were then prepared on a laboratory scale in lumps of 2 to 3 cm diameter and 1.5 to 2 cm thickness. These lumps were subjected to leaching test by immersing in pure water of normal temperature, whereby the water resistance of each glass was examined.

It was found that three component glasses each using $SiO_2$, PbO and CuO as a third component, as well as all $Na_2O$-$B_2O_3$ two component glasses, showed high quantities of leached out Na and therefore these elements were far from satisfactory as vitric solid solutions aimed at by the present invention. Also, glasses each using $ZrO_2$, $TiO_2$ and MgO as a third component where not satisfactory from the viewpoint of the leaching rate of Na and the fluidity of molten glass.

Figure 4:
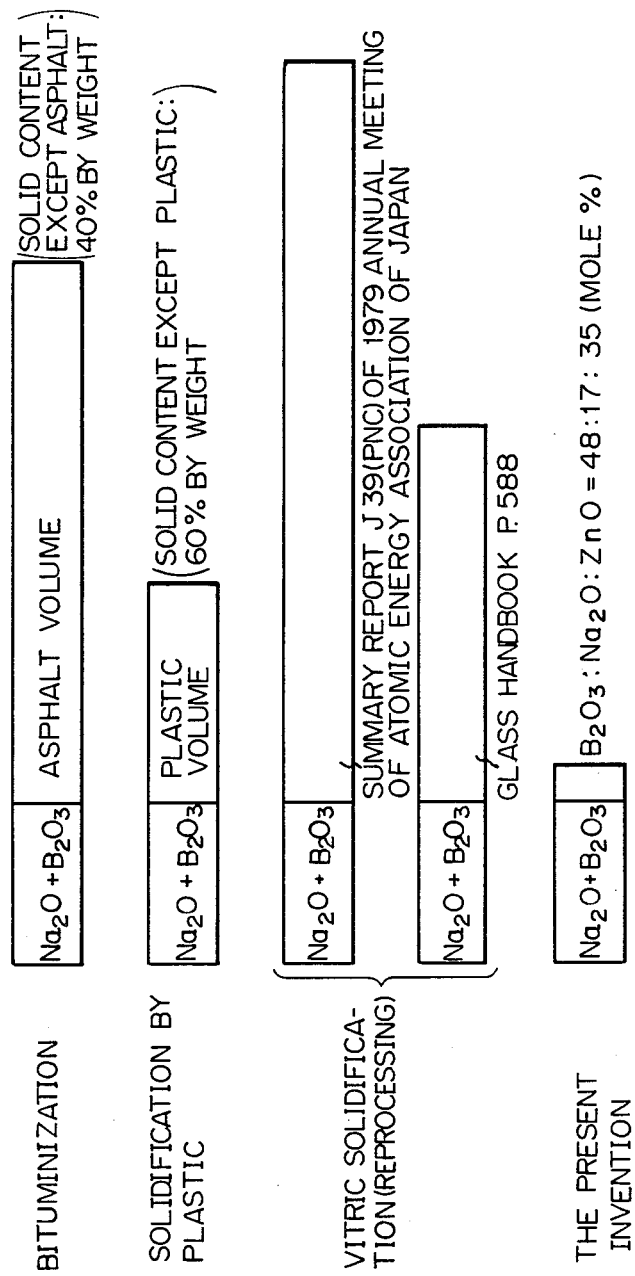
FIG. 4 is a drawing showing a volume comparison of various solidified waste solutions.

On the other hand, a glass using ZnO as a third component showed a very low leaching of Na, excellent volume reduction effect and satisfactory strength, which was a surprise. Next to this glass, glasses using $Al_2O_3$ and CaO as a third component were fairly good in water resistance. In FIG. 4, there is shown a comparison of volume between the vitric solid solution according to the present invention process and solidified wastes according to various other processes.

Figure 6:
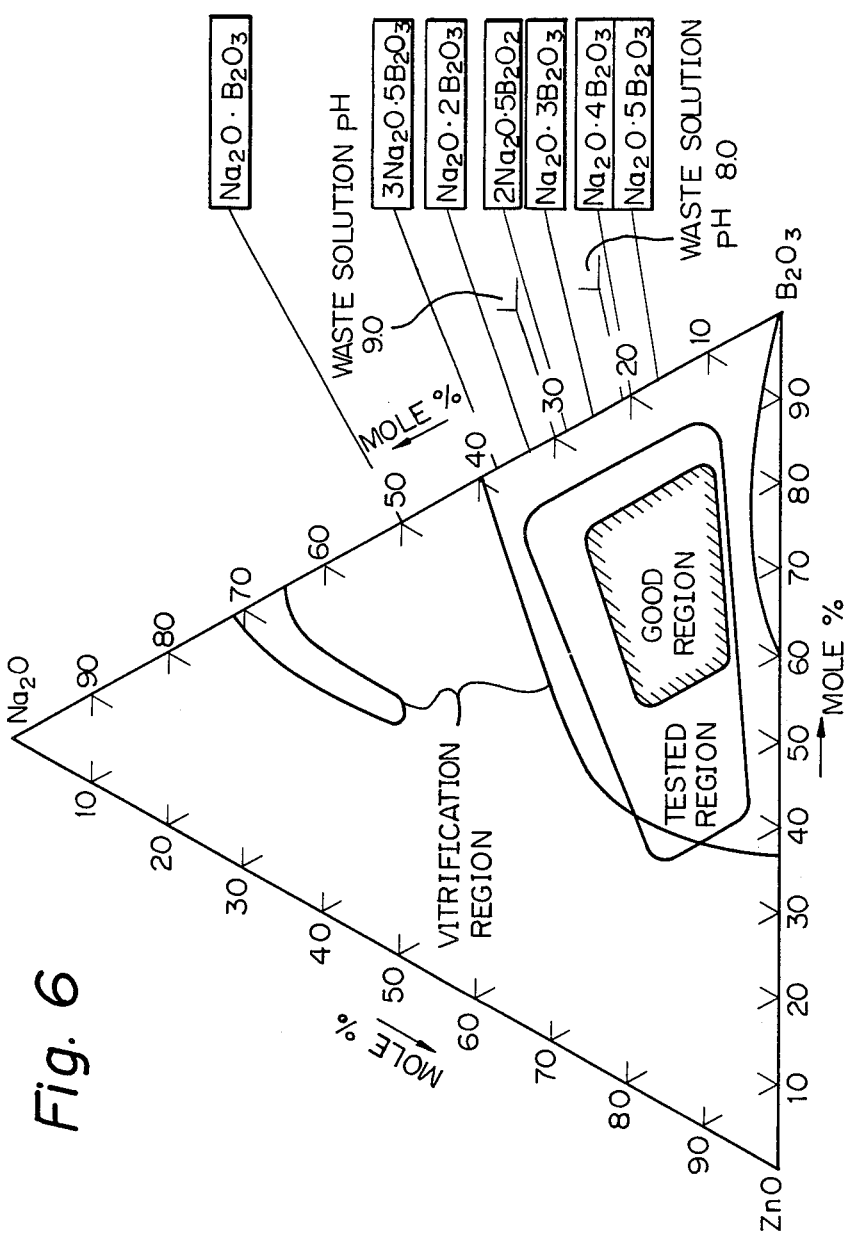
FIG. 6 is a drawing showing three component systems of $Na_2O$-$B_2O_3$-ZnO glass.

Hence, there were produced, by heating by microwave irradiation, various $B_2O_3$-$Na_2O$-ZnO three component glasses each falling in the tested region within the vitrification region of FIG. 6, and these glasses were tested for the leaching rate of Na to examine their water resistances.

Figure 8:
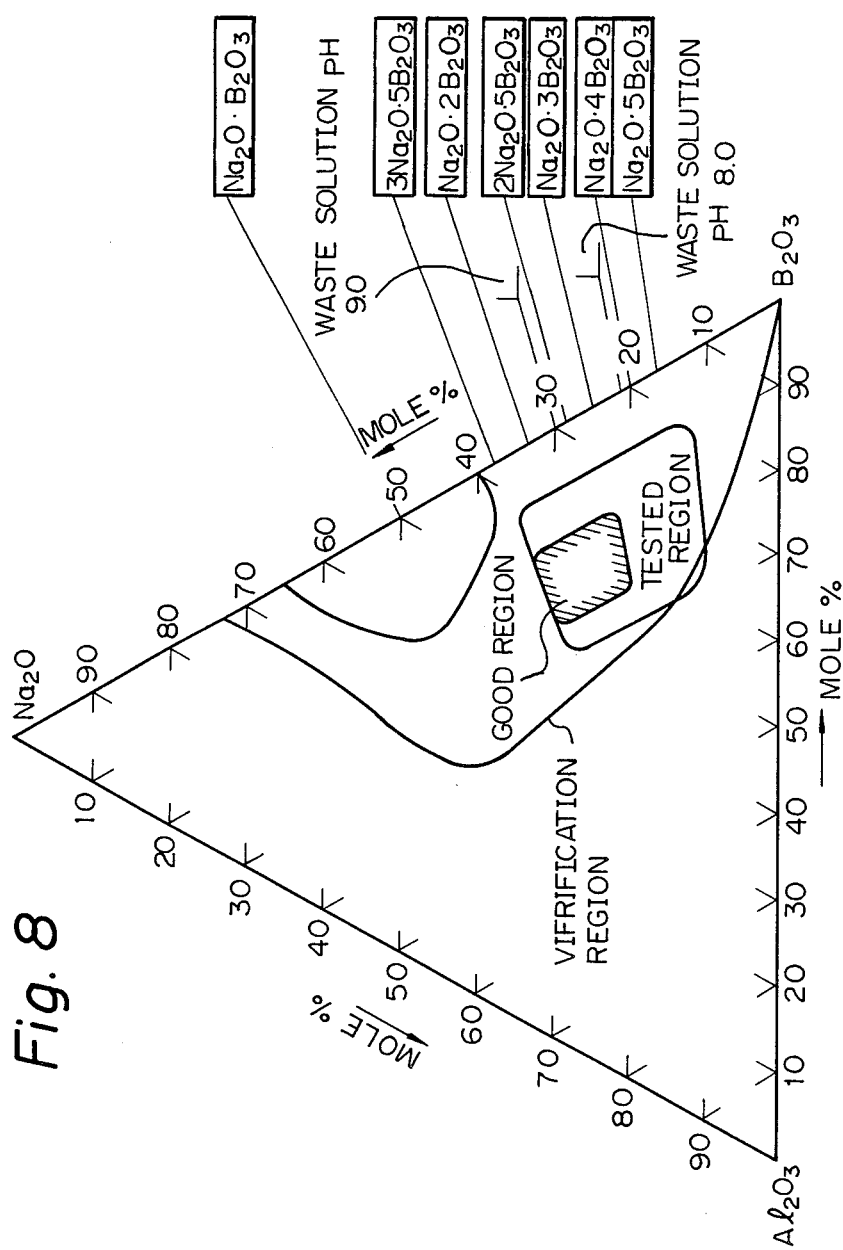
FIG. 8 is a drawing showing three component systems of $Na_2O$-$B_2O_3$-$Al_2O_3$ glass.

Incidentally, the vitrification region to FIG. 6 was obtained by reading FIG. 8.24 of page 886 of Glass Handbook compiled by Sakka, Sakaino and Takahashi (1975) after magnification.

Figure 7:
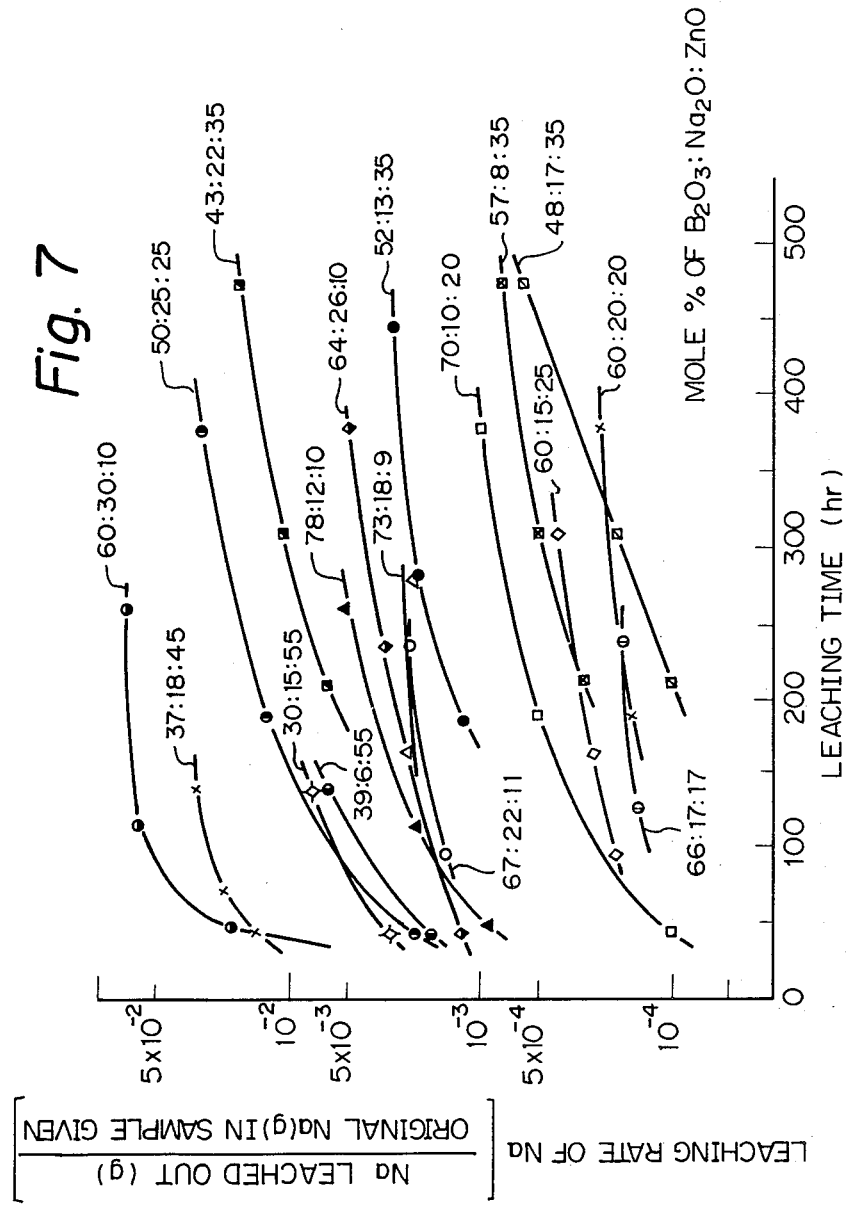
FIG. 7 is a drawing showing relations between ratio of Na leached out into water and leaching time, of $Na_2O$-$B_2O_3$-ZnO three component glasses.

The results of the above test on the leaching rate of Na are shown in FIG. 7. In FIG. 7, the abscissa represents time leaching and the ordinate represents ratio of Na leached out.

In the same manner as mentioned above, there are also produced various $Na_2O$-$B_2O_3$-$Al_2O_3$ three component glasses each falling in the tested region of FIG. 8, and they were tested for the quantity of Na leached out.

The vitrification region of FIG. 8 was obtained by reading FIG. 8.14 of page 884 of Glass Handbook after magnification.

Figure 9:
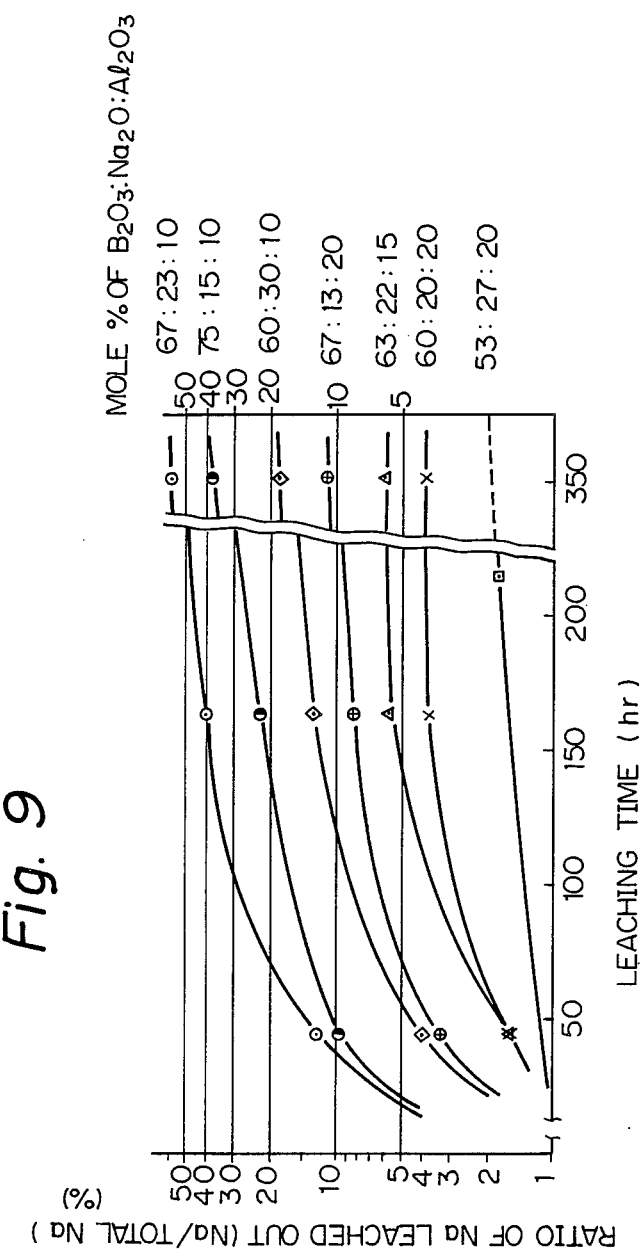
FIG. 9 is a drawing showing relations between ratio of Na leached out into water and leaching time of $Na_2O$-$B_2O_3$-$Al_2O_3$ three component glasses.

The results of the above test are shown in FIG. 9. In FIG. 9, the abscissa represents leaching time and the ordinate represents ratio of Na leached out.

As for glasses using ZnO as a third component, as shown in FIG. 6, there were tested those compositions having a $Na_2O$ to $B_2O_3$ molar ratio of 1/10 to 3/5 and a ZnO content of 7 to 57 mole %. The results indicated that compositions having a $Na_2O$ to $B_2O_3$ molar ratio of 1/10 to 3/5 and a ZnO content of 10 to 40 mole % are of practicable use and compositions good in both water resistance and volume reduction effect are those having a $Na_2O$ to $B_2O_3$ molar ratio of 0.10 to 0.45 and a ZnO content of 13 to 38 mole %.

As is clear from FIG. 5, sodium borate solutions having a $Na_2O$ to $B_2O_3$ molar ratio of 0.1 to 0.45 have a pH of 6.3 to 9.1 when the boron content in these solutions is 21,000 ppm which is close to the boron content in concentrates of PWR sodium borate waste solutions. Accordingly, it was found that PWR sodium borate solutions have the optimum $Na_2O$ to $B_2O_3$ molar ratio for their solidification in the form of a $Na_2O$-$B_2O_3$-ZnO three component systems.

As for glasses using $Al_2O_3$ as a third component, as shown in FIG. 8, there were tested those compositions having a $Na_2O$ to $B_2O_3$ milar ratio of 1/7 to 3/5 and an $Al_2O_3$ content of 7 to 27 mole %. The results indicated that compositions fairly good in both water resistance and volume reduction effect are those having a $Na_2O$ to $B_2O_3$ molar ratio of 1/3 to 3/5 and an $Al_2O_3$ content of 13 to 23 mole %. As is clear from FIG. 5, compositions having a $Na_2O$ to $B_2O_3$ molar ratio of 1/3 to 3/5 correspond to concentrates of PWR sodium borate waste solutions having a pH of 8.5 to 9.6.

Comparison between FIG. 7 and FIG. 9 indicates that three component glasses using ZnO as a third component are far superior in water resistance to three component glasses using $Al_2O_3$ as a third component. Accordingly, the former type of glasses is best in producing vitric solid solutions from PWR sodium borate waste solutions.

In $Na_2O$-$B_2O_3$-ZnO three component glasses, as the pH, namely, the $Na_2O$ to $B_2O_3$ molar ratio of sodium borate waste solution as a material, increases, the water resistance of the vitric solid solution formed decreases slightly. On the other hand, in $Na_2O$-$B_2O_3$-$Al_2O_3$ three component glasses, the higher the pH of the sodium borate waste solution, the better is the water resistance of the vitric solid solution formed. In order to improve the above drawback of $Ba_2O$-$B_2O_3$-ZnO three component glasses, $Al_2O_3$ were added to these glasses as an auxiliary component, whereby it was found that, when $Na_2O$-$B_2O_3$-ZnO three component glasses are produced from sodium borate waste solutions of a pH of 9 to 9.6, the above drawback can be improved by addition of 3 to 10 mole % of $Al_2O_3$. A similar tendency was also confirmed in the case of CaO addition.

PWR sodium borate waste solutions contain, as impurities, 100 ppm or less of Li, Ca, Mg, Cr, Fe, $PO_4^{-3}$ and $SiO_2$. All these impurities can become components of vitric solid solutions and their existence does not affect the water resistances of $Na_2O$-$B_2O_3$-ZnO glasses.

As shown in FIG. 5, the $Na_2O$ to $B_2O_3$ molar ratio is dependent upon the pH of a solution containing these components. Hence, in producing a vitric solid solution from a PWR sodium borate waste solution, the $Na_2O$ to $B_2O_3$ molar ratio of the solution can be known by measuring the pH of the solution.

With respect to processes for converting radioactive wastes into vitric solids by microwave irradiation heating, the following patent applications have been made.

Japanese Patent Laid-open Publication No. 9111/1980, "Process for Converting Radioactive Wastes into Vitric Solids and Apparatus therefor" (TOSHIBA)

Japanese Patent Laid-open Publication No. 121897/1980, "Process for Treating Wastes by Microwave Heating" (KOBE STEEL)

Japanese Patent Publication No. 22280/1983, "Process for Drying, Melting and Solidifying Slurries" (Joint application by KOBE STEEL and BELGONUCLAIRE)

Further, with respect to processes for producing borosilicate glasses containing Zn, the following patent application has been made.

Japanese Patent Publication No. 56040/1982, "Process for Producing Radioactive Waste-Containing Substances" (TÜLICH of West Germany)

Vitric solids described in Japanese Patent Laid-open Publication No. 9111/1980 comprise 53.7% of $SiO_2$, 17.5% of $B_2O_3$, 12.5% of $Na_2O$, 5.0% of $Al_2O_3$ and 2.5% of ZnO. These solids are compositionally different from the vitric solid solution of the present invention because they contain over 50% of $SiO_2$ and low levels of $B_2O_3$, $Na_2O$ and ZnO.

In Japanese Patent Laid-open Publication No. 121897/1980, when vitric solids are produced from wastes by microwave heating vitric or ceramic containers are used which are easily meltable by absorption of a microwave, and these containers are made into solids integrally with wastes. The containers are made of $SiO_2$-$B_2O_3$-CaO-BaO-$Al_2O_3$ glass or of glass or ceramic composed of $SiO_2$, $Al_2O_3$, CaO, MgO, $Na_2O$, $K_2O$, PbO, $B_2O_3$, $CaF_2$, etc. Vitric solids produced from the above invention are different from the present invention product in that they contain $SiO_2$ and further in that they contain no ZnO.

In Japanese Patent Publication No. 22280/1983, there is used an apparatus having a structure partially similar to that of the present invention. With respect to raw materials used, broad definition only is given of "waste solution concentrates at evaporator bottoms, chemical precipitation sludges, etc. discharged from atomic power facilities such as atomic power plants". When powders per se of these raw materials can not be converted into vitric solids, the powders are melted integrally with vitric or ceramic containers comprising $SiO_2$, CaO, MgO, $Na_2O$, $Al_2O_3$, $K_2O$, PbO, $CaF_2$, etc. These solids are basically different from the present invention product in that they do not use Zn as one of their major components.

Compositions described in Japanese Patent Publication No. 56040/1982 are composed of 35% of $SiO_2$, 16% of $Al_2O_3$, 8% of $B_2O_3$, 2% of $Na_2O$, 3% of $Li_2O$, 5% of CaO, 1.5% of MgO, 18.5% of BaO, 1% of $ZrO_2$, 5% of $TiO_2$ and 4.5% of ZnO and are compositionally different from the present invention product.

As an example of vitric solidified wastes containing a relatively large quantity of Zn, there is "73-1 Frit" described in Table 2 of a paper entitled "On Corrosion Resistances of Metallic Materials for Containers for Vitric Solids of Highly Radioactive Wastes" appearing in JAERI-M82-007 issued in February 1982. This frit is composed of 37% of $SiO_2$, 28.9% of ZnO, 5.5% of $Na_2O$, 5.5% of $K_2O$, 2.0% of SrO, 2.0% of BaO, 2.0% of CaO, and 2.0% of MgO, and is compositionally different from the present invention product in that the former contains a large quantity of $SiO_2$ and does not contain B.

Figure 10:
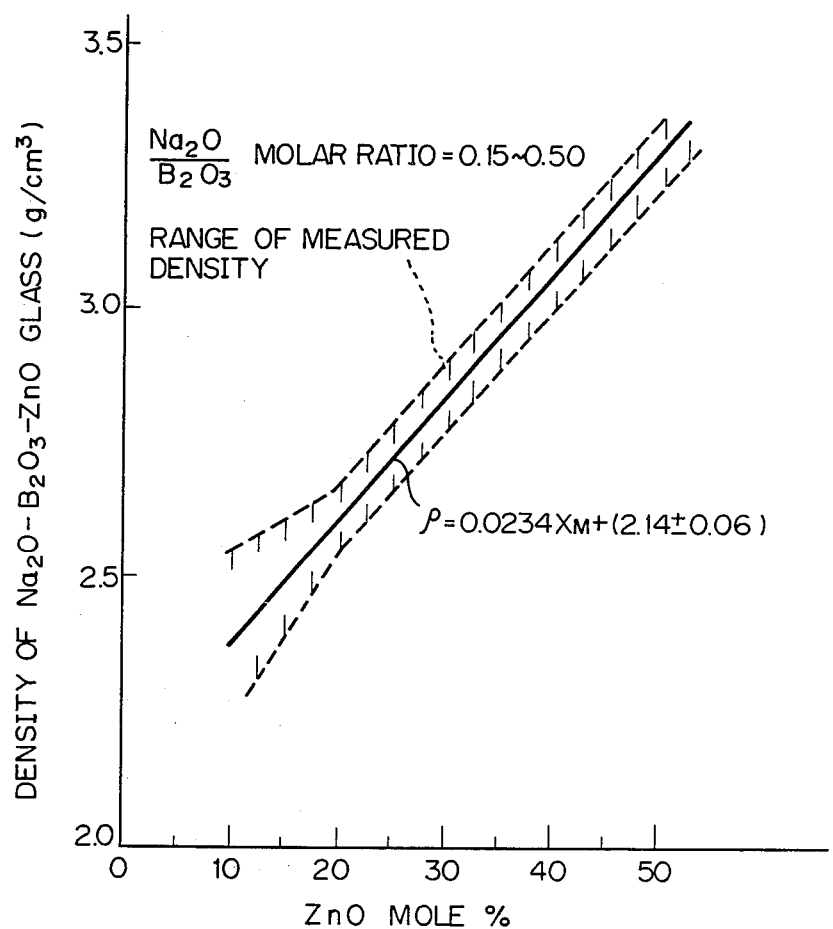
FIG. 10 is a drawing showing densities of $Na_2O$-$B_2O_3$-ZnO three component glasses.

Various $Na_2O$-$B_2O_3$-ZnO three component glasses each having a $Na_2O$ to $B_2O_3$ molar ratio of 0.15 to 0.50 were produced by microwave irradiation heating. Their densities at 20° C. were measured. The results are shown in FIG. 10. In FIG. 10, the solid line represents calculated values and $X_M$ in the equation represents mole % of ZnO.

These vitric solids have densities above 2.0 which are far larger than "specific gravity 1.2" required for solidified radioactive wastes.

Figure 11:
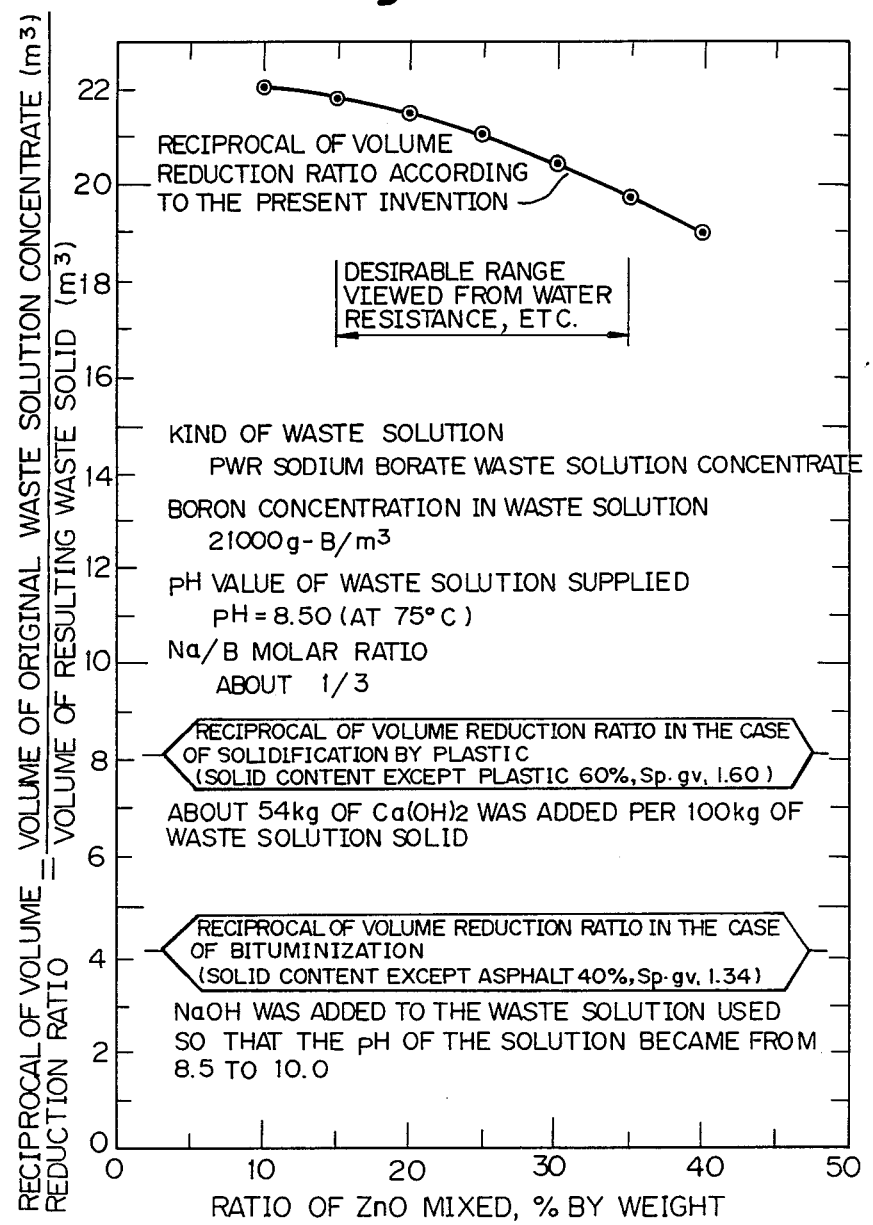
FIG. 11 is a drawing showing reciprocals of volume reduction ratios of vitric solid solutions of the present invention, a plastic-waste mixed solid and an asphalt-waste mixed solid.

Based on the measured density of a $Na_2O$-$B_2O_3$-ZnO three component glass having a $Na_2O$ to $B_2O_3$ molar ratio of about 1/3, volume reduction efficiency was calculated with a PWR sodium borate waste solution containing 21,000 ppm of boron was solidified according to the present invention process. The results are shown in FIG. 11. In FIG. 11, the abscissa is expressed in percent by weight and not in mole percent. In FIG. 11, there were also shown volume reduction effects when the above waste solution was solidified by the use of an asphalt or a plastic.

As is obvious from FIG. 11, vitric solid solutions of the present invention have far larger volume reduction effects than solidified wastes obtained by the bituminization or plastic solidification processes.

The leaching rate of Na out of $Na_2O$-$B_2O_3$-ZnO three component solids of the present invention was compared, as is shown in FIG. 7, with that of a bituminized waste solid the solid content of waste origin of which was about 40% by weight, the binder of the bituminized product was straight asphalt of a penetration index of 40 to 60, and the solid in the product was evaporation residue of sodium borate solution of a Na to B molar ratio of 1/3.

Those vitreous products with a composition which falls within the scope of a good composition as for water resistance as shown in FIG. 6 gave a sodium leaching rate equal to or better than that of the above bitumen product.

Figure 3:
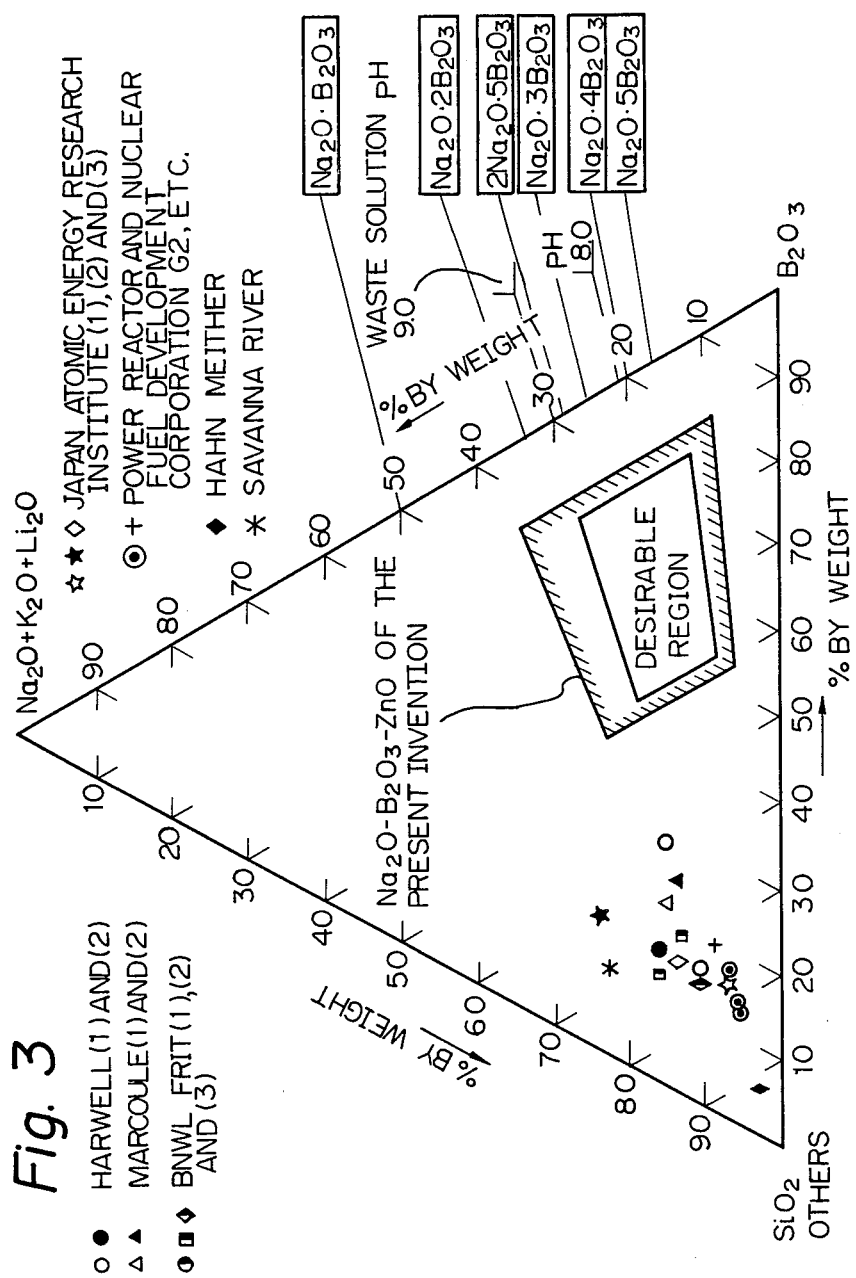
FIG. 3 is a drawing showing three component systems of borosilicate glass.

As shown in FIG. 3, the vitric solid solution of the present invention has a composition apparently different from those of frits for vitric solidified wastes used at reprocessing plants of foreign countries.

In the present invention, there can be used, besides ZnO, a zinc compound capable of producing ZnO when melted, such as, for example, $ZnCO_3$, $Zn(OH)_2$ and $Zn(NO_3)_2$. The use of $ZnCl_2$ is not desirable because $ZnCl_2$ can convert radioactive iron, manganese or other transition metals contained in waste solutions into volatile chlorides.

Next, referring to the accompanying drawings, a process for producing a vitric solid solution and an apparatus therefor, of the present invention will be explained in detail.

Sodium borate waste solutions show a unique behavior caused by sodium borate in the course of evaporation-drying-powderization. Slight modification of solidification apparatus becomes necessary depending upon the type of this behavior.

This unique behavior is as follows. When a sodium borate waste solution is concentrated and is made into a solid crystal, it occurs in some cases that, right before the solid crystal is obtained, sodium borate becomes a fluid, highly viscous substance like thick malt syrup. This formation of a highly viscous substance depends mainly upon the pH of the waste solution. Specifically, when the waste solution has a pH of 7.7 to 9.0, the dried material of the waste solution becomes a higjly viscous substance at 100° to 200° C. as shown at the top of FIG. 5. If this substance is further heated to a higher temperature, it causes "puffing" and suddenly swells becoming a porous solid like caramel or popcorn. The dried material of a waste solution having such a pH range as gives a powder when heated to 100° to 200° C., swells likewise when it is heated to a temperature higher than 200° C. and loses its crystal water.

Figure 12:
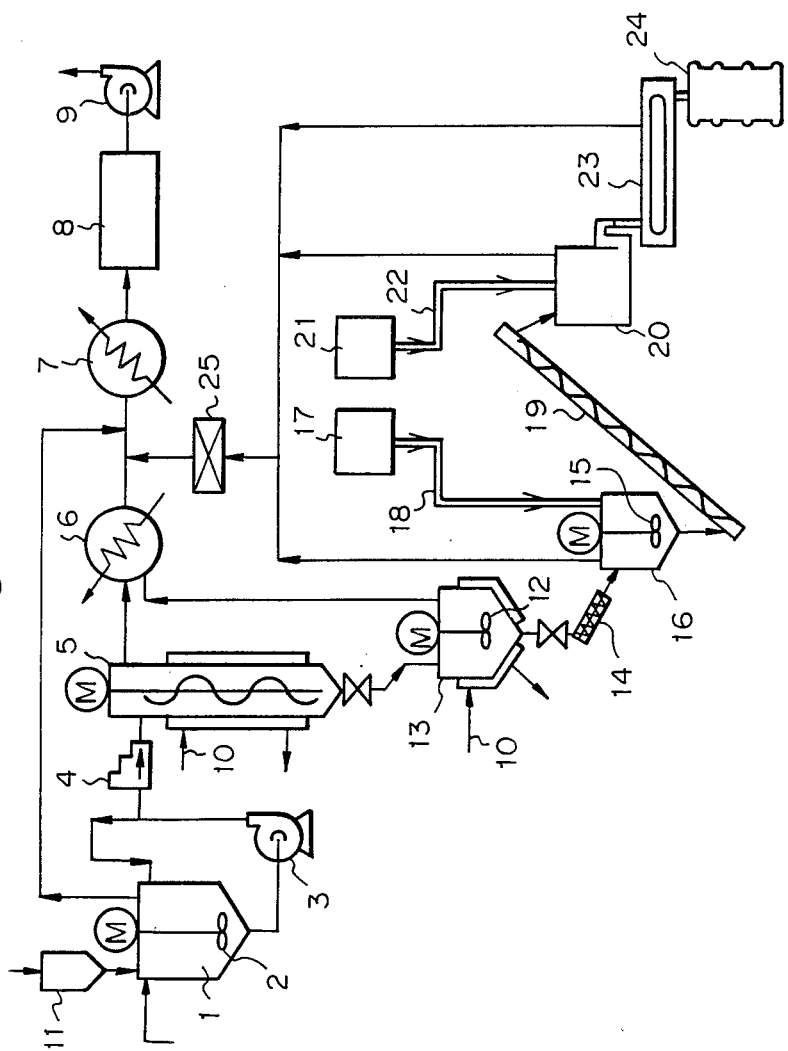
FIGS. 12 to 16 show specific examples of apparatuses for producing vitric solid solutions of the present invention.

For a waste solution having such a pH range as gives the above highly viscouse substance, there can be used a solidification apparatus such as, for example, that shown in FIG. 12.

The present invention will be explained in detail referring to FIG. 12.

In FIG. 12, 1 is a waste solution feed tank; 2 is a stirrer; 3 is a waste solution circulation pump; 4 is a waste solution supply pump; 5 is a thin film evaporator;

6 is a steam condenser; 7 is an off-gas cooler; 8 is an off-gas treatment equipment; 9 is an off-gas exhaust fan; 10 is an inlet for heating fluid; 11 is a hopper for stabilizing agent in water; 12 is a stirrer; 13 is a heating type dehydrator; 14 is a discharger; 15 is a stirrer; 16 is a powder drier; 17 is a microwave generator; 18 is a microwave guide tube; 19 is a conveyor 20 is a melting furnace; 21 is a microwave generator; 22 is a microwave guide tube; 23 is a cooler; 24 is a container for solid solution; and 25 is a prefilter.

A preconcentrated sodium borate waste solution having a boron content of 20,000 to 21,000 ppm as boron, is charged into a waste solution feed tank 1. While the waste solution is being stirred and circulated by a stirrer 2 and a waste solution circulation pump 3, the waste solution is sampled to measure the quantity of sodium borate in the solution by chemical analysis and to calculate the quantity of said stabilizing agent in water to be added. The stabilizing agent, composed mainly of an inorganic zinc compound, is metered and sent from a hopper 11 for stabilizing agent in water to the waste solution feed tank. In order to prevent the settling of the agent, the stirrer 2 and the waste solution circulation pump 3 are continuously operated.

The waste solution obtained after the above treatment is sent to a thin film evaporator 5 by a waste solution supply pump 4 at a given flow rate, where the waste solution is evaporated and concentrated to remove water.

The evaporated water is introduced into a condenser 6. The non-condensed gas composed mainly of wet air, from the condenser 6 enters an off-gas cooler 7 for removal of residual water, is purified by an off-gas treatment equipment 8 comprising a rough filter, a high efficiency absolute filter, an active carbon filter, etc., and is discharged from an off-gas exhaust fan 9.

A heating fluid for the thin film evaporator 5 which is introduced through a pipe 10 is steam or a heat transfer oil. This heating by fluid may be replaced by electric heating, high frequency heating or low frequency heating.

The evaporator 5 is a thin film type of evaporator. This evaporator has the functions of evaporation, drying and powderization of the waste solution. However, when the quantity of the waste solution to be treated for solidification is large, the total operation time per annum of the evaporator 5 becomes long causing a wear between the rotor blade and the heating surface of the evaporator 5. Further, when the evaporator 5 treats a highly viscous substance (as mentioned above) from a waste solution of a pH of 7.7 to 9.0, a larger torque is required necessitating the increase of the horsepower of the drive motor for the evaporator 5. Hence, in order to avoid the problems of this wear and the need for larger torque, drying and powderization are not conducted in the evaporator 5, and only evaporation and concentration is conducted to an extent that the evaporation residue can flow from the evaporator 5 bottom down to a heating type dehydrator 13 by gravity.

The evaporation residue in the heating type dehydrator 13 is heated by a heating fluid while being stirred by a stirrer 12, for further evaporation. This heating fluid introduced from an inlet 10 is steam or a heat transfer oil, similar to the case of heating the evaporator 5. This heating by fluid may be replaced by electric heating, high frequency heating or low frequency heating. The evaporation residue obtained in the heating type dehydrator 13 which still contains a very small quantity of water but has an extremely low fluidity, is forcibly discharged into a powder dryer 16 by a discharger 14. This discharging operation is conducted batchwise when the evaporator 5 is at a stop. The steam from the heating type dehydrator 13 is introduced into the condenser 6.

In the heating type dehydrator 13, the waste solution concentrated to a state of thick malt syrup in the evaporator 5 is further concentrated to a state of much thicker malt syrup or a mixture of thick malt syrup and granulated sugar. In some cases, the concentrated waste solution becomes dry and swells. In such cases, the concentrate is ground by the stirrer 12.

The evaporation residue in the powder drier 16 is irradiated with a microwave transmitted from a microwave generator 17 through a microwave guide tube 18 and becomes a dried material having a water content of 5% or less. The evaporation residue composed mostly of sodium borate swells, in the course of losing its crystal water, into a porous lump due to "puffing"; therefore, the lump is ground into a powder by stirrer 15 so that transfer to the following steps can be conducted smoothly. The purge air blown into the powder drier 16 for prevention of the discharge of microwaves, as well as a small quantity of steam from the evaporation residue are sent to the off-gas cooler 7 through a prefilter 25.

The evaporation residue dried and powderized in the powder dryer 16 is sent to a melting furnace 20 by a conveyor 19, batchwise, semi-batchwise or continuously. In the melting furnace 20, the powder sent is melted into a vitric melt by heating with a microwave transmitted from a microwave generator 21 through a microwave guide tube 22. This melt is successively discharged from the outlet of the melting furnace 20 and flows down into a cooler 23.

In FIG. 12, there is shown a case where the above melt is filled into 200 liter drums in a volume-reduced, intermediate form in small lumps or fragments of non-uniform sizes. This filling style is provided on the basis of the following two thoughts.

(1) In Japan, no official guideline standard for ultimate disposal of solidified radioactive wastes has yet been established. Accordingly, these solidified wastes, if prepared in a volume-reduced, intermediate form in vitric small lumps or fragments, will be more easily modified when necessary so as to meet any standard for solidified radioactive wastes which may possibly be established in the near future.

(2) The vitric solid solution of the present invention has a very large volume reduction effect. Hence, the minus factor for this volume reduction effect which is caused by a space arising when the above-mentioned small lumps or fragments of non-uniform sizes are filled in a container such as drum is sufficiently offset by the largeness of volume reduction effect of the present invention product.

The vitric melt according to the present invention process can easily be made into small lumps or fragments of non-uniform sizes, by a cooling means such as air cooling, wtaer spraying, pouring into water or the like. Therefore, the cooler 23 is structured so as to have an air-cooling, water-spraying or water-cooling mechanism, to accommodate a horizontal rotary disc or a horizontally moving conveyor, and to enable receipt of a vitric melt at one end and discharge of the cooled vitric solid solution in the form of small lumps or fragments at the other end.

The above vitric solid solution discharged from the cooler 23 is filled in a solid solution container 24 such as a 200 liter drum.

The exhaust gases from the melting furnace 20 and the cooler 23 are sent to the off-gas cooler 7 through the prefilter 25.

Another embodiment of the present invention will be explained by way of FIG. 13.

Figure 13:
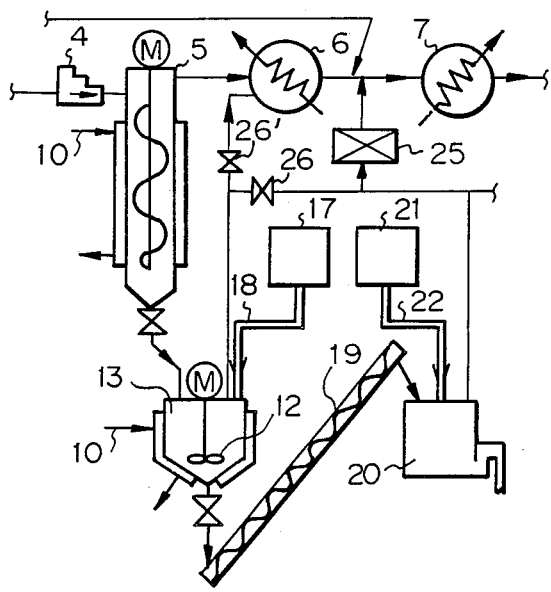

The apparatus shown in FIG. 13 differs from the one shown in FIG. 12, in that (1) the powder dryer 16 in FIG. 12 is eliminated, (2) the evaporation residue from an evaporator 5 is heated, dried and powderized by microwave irradiation in a heating type dehydrator 13 and the resulting product is sent directly to a melting furnace 20, and (3) a microwave guide tube 18 from a microwave generator 17 is combined with the heating type dehydrator 13 so as to use a microwave as a heat source for the heating type dehydrator 13. This apparatus is suitable when the quantity of sodium borate waste solution treated is small and when there is used such a waste solution as (a) gives a small quantity of a highly viscous substance at the step of evaporation of waste solution to dryness, (b) requires a small torque at the evaporator 5, and (c) can smoothly discharge the concentrate from the evaporator 5 bottom even if the concentrate is highly concentrated and dried.

In FIG. 13, a waste solution feed tank, a hopper for stabilizing agent in water, etc. as well as coolers, etc. are not shown because they are the same as used in FIG. 12.

In FIG. 13, each symbol has the same definition as in FIG. 12 except symbols 26 and 26'. 26 and 26' are each a gas switch valve.

A sodium borate waste solution mixed with a stabilizing agent in water composed mainly of ZnO is charged through a waste solution supply pump 4 into an evaporator 5, where the waste solution is evaporated and concentrated to a concentration about equal to or higher than that in the apparatus of FIG. 12. The concentrate is sent to a heating type dehydrator 13. When the quantity of the concentrate in the dehydrator 13 has reached a desired level, the evaporator 5 is stopped and the gas outlet at the evaporator top is closed. The heating type dehydrator 13 is heated to about 160° C. by a heating fluid supplied through a heating fluid supply pipe with the dehydrator content being stirred by a stirrer 12, whereby the concentrate from the evaporator 5 is further concentrated and water is removed as much as possible. The water evaporated in this step is sent to a condenser 6, and therefore a valve 26 is left closed and a valve 26' is left open. Water is removed as much as possible to prevent possible microwave discharge due to steam in the subsequent step of microwave drying.

Then, the valve 26' is closed and the valve 26 is opened to allow the flow of a gas generated in the heating type dehydrator through a prefilter 25, and a microwave is introduced into the dehydrator 13 from a microwave generator 17 through a microwave guide tube 18. By microwave heating, the evaporator residue in the dehydrator is dried and powderized. The dry powder is then sent to a melting furnace 20 by a conveyor 19, where it is heated with a microwave transmitted from a microwave generator 21 thrugh a microwave guide tube 22, and melted and converted into a vitric melt. Thereafter, the melt is cooled and solidified as shown in FIG. 12.

Figure 14:
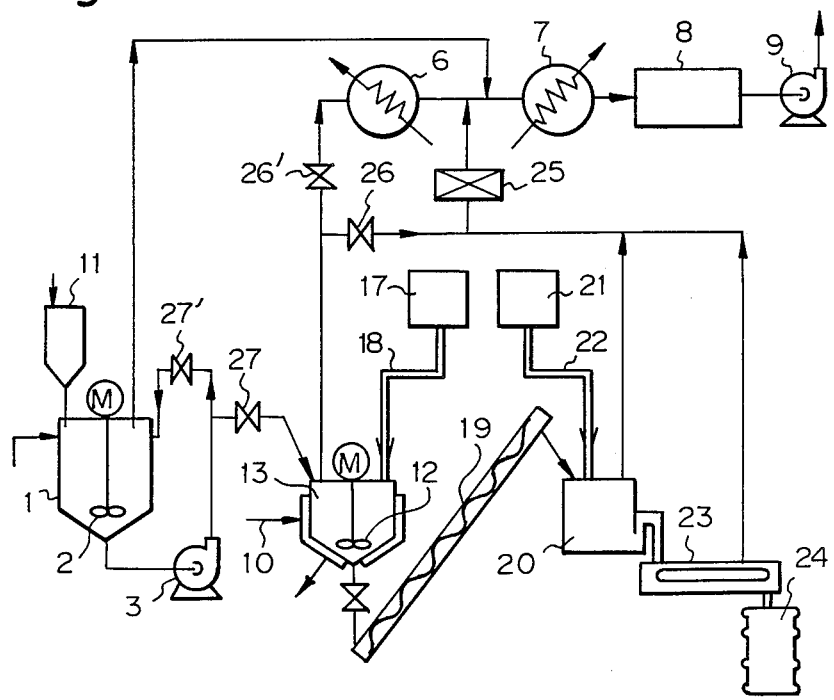

In FIG. 14 is shown an example of a solidification apparatus of small capacity wherein small quantities of waste solutions are treated and accordingly no thin film evaporator is required and water can gradually be evaporated batchwise in a heating type dehydrator without causing any problem because of the small quantity of waste solution being treated.

In FIG. 14, each symbol has the same definition as in FIGS. 12 and 13 except 27 and 27'. Symbols 27 and 27' represent waste solution switch valves provided in pipes extending from the outlet of a waste solution circulation pump 3 for a heating type dehydrator 13 and a waste solution feed tank 1, respectively.

A waste solution switch valve 27' (at the outlet side of a waste solution circulation pump 3) is closed and a waste solution switch valve 27 is opened. Then, a sodium borate waste solution mixed with a stabilizing agent in water composed mainly of ZnO is filled into a heating type dehydrator 13, and the switch valve 27 is closed and the switch valve 27' opened. Subsequently, while being stirred with a stirrer 12, the waste solution in the dehydrator 13 is heated by a heating fluid introduced through a heating fluid pipe 10, whereby the waste solution is subjected to gradual evaporation and concentration on batch basis. During this stage, switch valves 26 and 26' are adjusted so that the steam generated in the dehydrator 13 can flow to a condenser 6. When the evaporation and concentration by the heating fluid is over, the switch valve 26' is closed and the switch valve 26 is opened so that the steam generated, etc. can flow to a prefilter 26. Then, a microwave generator 17 is started and a microwave is introduced into the dehydrator 13 through a microwave guide tube 18 to dry and powderize the evaporation residue in the dehydrator 13. During this drying and powderization, stirring by the stirrer 12 is continued. Thereafter, the dried powder obtained is converted to a vitric solid solution by microwave irradiation, in the same manner as in FIG. 12.

In the apparatuses of FIGS. 12 to 14, a hopper for a stabilizing agent in water composed mainly of ZnO is connected with a waste solution feed tank. As already mentioned, the hopper for stabilizing in water may be connected with a heating type dehydrator or a powder drier.

In FIGS. 12 to 14, a vitric solid solution is filled in cylindrical containers in a volume-reduced, intermediate form in small lumps or fragments. However, cylindrical containers are not desirable because when stored spaces are left between them and as a result they can not effectively utilize the space available in store houses regardless of whether they are piled in a standing position or in a lying position. Hence, containers of rectangular parallelepiped type are preferred. These rectangular parallelepiped type containers are able to utilize available space in store houses more effectively.

In order to realize (1) effective use of container capacity as well as (2) volume reduction effect as shown in FIG. 11, it is desirable that a vitric solid solution be sealed or filled in a container in one block and not in small lumps or fragments. Apparatuses satisfying such an aim are shown in FIGS. 15 and 16.

These apparatuses differ from those of FIGS. 12 to 14 only in the melting and solidification step. Therefore, FIGS. 15 and 16 are shown with that difference focused on.

Figure 15:
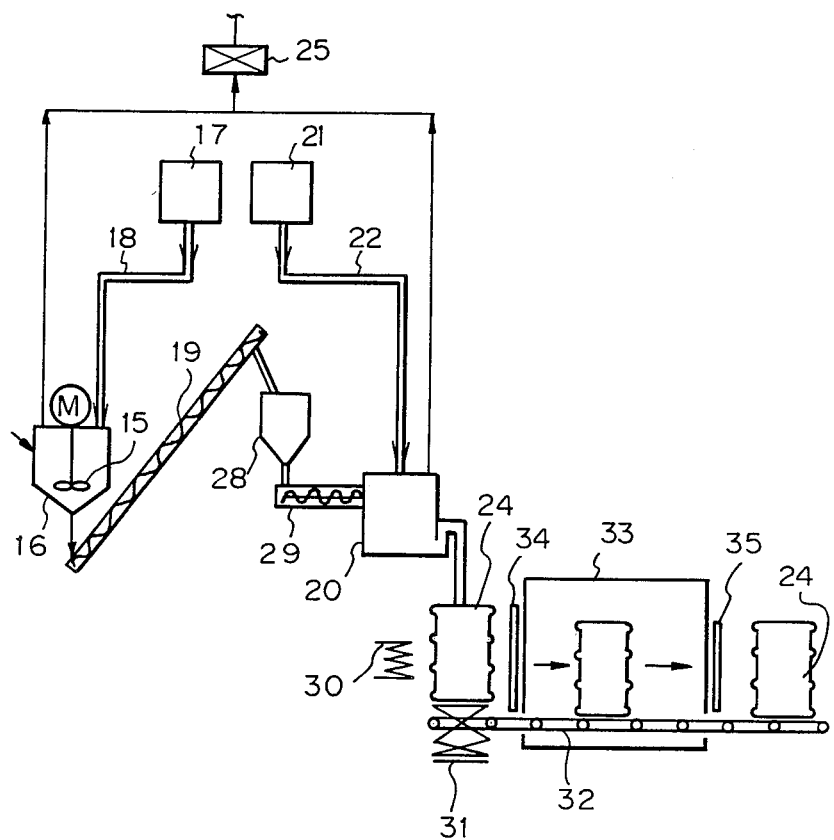
Figure 16:
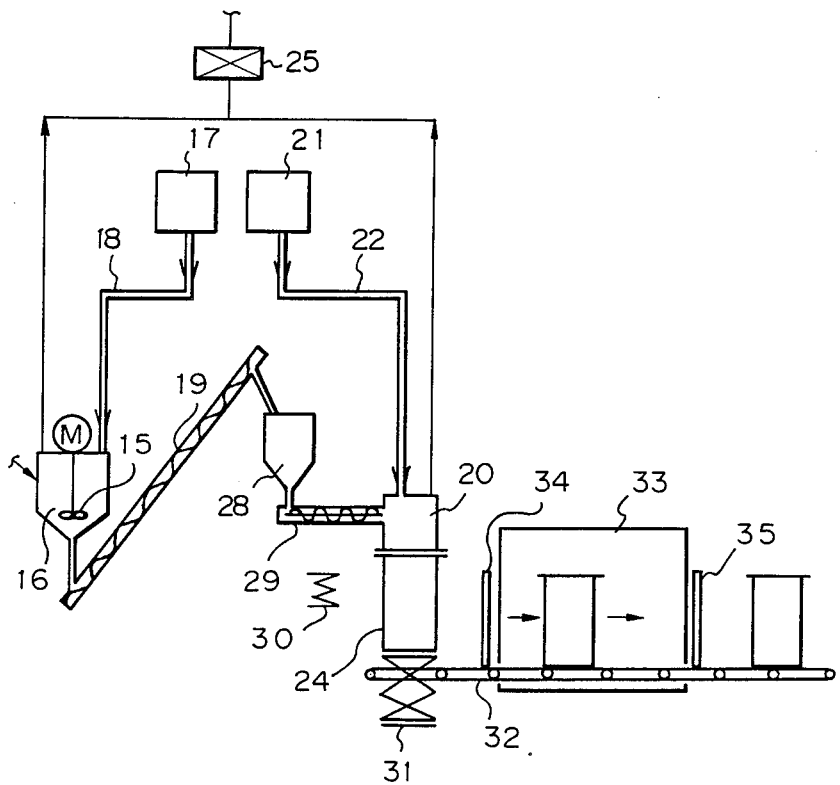

In FIGS. 15 and 16, symbol 28 is a dried powder hopper; 29 is a feeder; 30 is a rapid cooling prevention heater; 31 is a container lift; 32 is a container conveyor; 33 is a slow cooling chamber; 34 is an inlet door; and 35 is an outlet door. Other symbols each have the same difinition as in FIGS. 12 to 14.

In the apparatus of FIG. 15, a dried powder is melted by microwave irradiation in a melting furnace 20; the resulting vitric melt is directly filled in containers without being cooled; and the melt is slowly cooled in the container, whereby a vitric solid solution is formed in one block.

That is, a dried material sent from a powder dryer 16 by a conveyor 19 is once stored in a dried powder hopper 28, then is sent into a melting furnace 20 by a feeder 29, and is melted into a vitric melt by irradiation of a microwave transmitted from a microwave generator 21 through a microwave guide tube 22. The vitric melt flows down from the outlet of the melting furnace 20 into a container 24. The filled container 24 is placed in a rapid cooling prevention heater 30 to prevent cracking of glass due to rapid cooling. When the quantity of vitric melt in the container has reached a predetermined level, the filled container 24 is lowered onto a conveyor 32 by the use of a container lift; an inlet door 34 of a slow cooling chamber 33 is opened; and the filled container 24 is moved into the slow cooling chamber 33 by the conveyor 32. After slow cooling, the filled container leaves the slow cooling chamber 33 at its outlet door 35.

The apparatus of FIG. 16 differs from that of FIG. 15 in that the former apparatus employs an in-can melting method wherein a container 24 for vitric solid solution is used as the lower half of a melting furnace 20.

In each apparatus of FIGS. 12 to 16, it is necessary that (1) the pipes and the ducts both connected with the heating type dehydrator 13, the powder dryer 16 and the melting furnace 20 wherein microwave irradiation is conducted, as well as (2) the shaft seal portions of the stirrers 12 and 15 should be provided with a radio shielding device, a choke seal or the like for prevention of microwave leakage.

In the above, processes have been explained for volume reduction and solidification of concentrated sodium borate waste solutions discharged from PWR facilities as well as apparatuses for conducting the processes. A mixture of the above sodium borate waste solution concentrate with a concentrate of a radioactive laundry waste water and/or a powdery residue from incineration of various radioactive solids can be subjected to volume reduction and solidification according to the present process, at which time there is obtained a vitric solid solution containing the radioactive cleaning waste and the radioactive incineration residue.

EFFECTS OF THE INVENTION

ZnO used in the vitric solid solution of the present invention is far more effective than other metal oxides in improvement of water resistance of the vitric solid solution. Further, the quantity of ZnO added is small.

Figure 17:
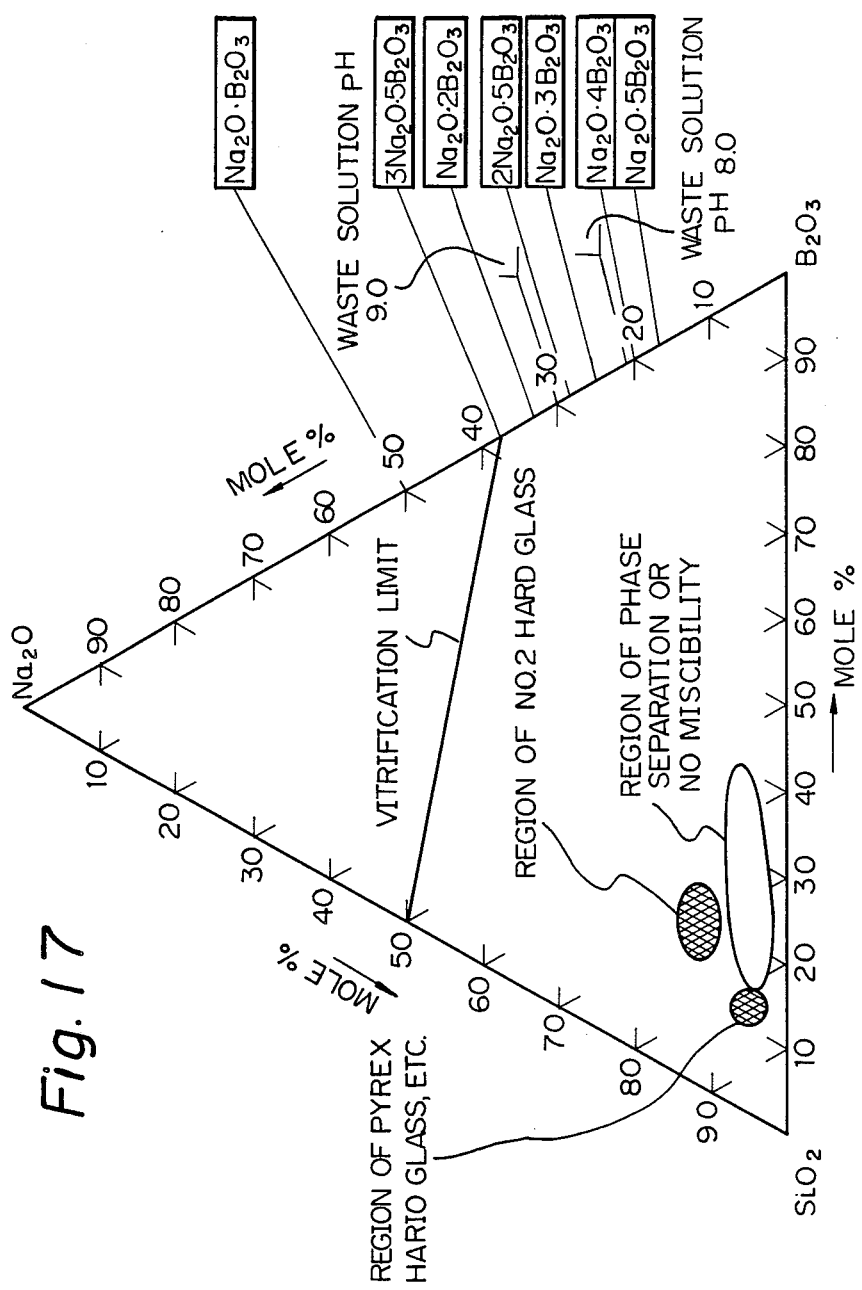
FIG. 17 is a drawing showing three component systems of $Na_2O$-$B_2O_3$-$SiO_2$ glass.

The vitric solid solution of the present invention has no phase separation region differently from $Na_2O$-$B_2O_3$-$SiO_2$ three component glasses shown in FIG. 17 and accordingly has no compositional restriction.

$Na_2O$-$B_2O_3$-$ZnO$ three component systems absorb microwaves well and thereby are easily melted and, therefore, can easily be vitrified.

What is claimed is:

1. An apparatus for producing a vitric solid solution comprising (a) the solid content of a radioactive waste solution of sodium borate discharged from a pressurized water reactor, having a $Na_2O$ to $B_2O_3$ molar ratio of 0.1 to 0.06 and (b) 10 to 40 mole % of ZnO or 10 to 40 mole % of ZnO plus 3 to 10 mole % of $Al_2O_3$ and/or CaO so that the total content of ZnO plus $Al_2O_3$ and/or CaO does not exceed 43 mole %, the apparatus comprising:
  (A) a waste solution feed tank equipped with a hopper for stabilizing agent in water, a stirrer for stirring the sodium borate waste solution and the stabilizing agent in water added thereto from said hopper;
  (B) a waste solution circulation pump for circulating a part of the resulting mixture to the waste solution feed tank and another part of the resulting mixture to an evaporator through a waste solution supply pump;
  (C) the evaporator for evaporating and concentrating the waste solution fed from the pump to remove water by a heating fluid so as to form an evaporator residue;
  (D) a heating type dehydrator for heating the evaporator residue sent from the evaporator by a heating fluid while being stirred by a stirrer, for further evaporation;
  (E) a powder dryer for removing the crystal water of the evaporation residue, thereby rendering said residue as a porous lump, by heating with a microwave generator through a microwave guide tube, and a stirrer for grinding the lump into a powder provided therein;
  (F) discharger means for forcible batch delivery of said residue to said powder dryer;
  (G) a melting furnace for melting into a vitric melt the dried power sent from the powder dryer by irradiation with microwaves transmitted from a microwave generator through a microwave guide tube, said melt being charged in a solid solution container;
  (H) a condenser for condensing the evaporated water generated from the evaporator and the heating type dehydrator;
  (I) a prefilter for filtering the off-gas from the powder dryer and the melting furnace to remove solids;
  (J) an off-gas cooler for removing the residual water of the off-gas from the waste solution feed tank, the condenser and the prefilter;
  (K) an off-gas treater for purifying the off-gas from the off-gas cooler to discharge it from an off-gas exhaust fan.

2. An apparatus for producing a vitric solid solution according to claim 1, wherein a cooler is attached to the melting furnace for cooling the melt successively discharged from the melting furnace to the vitric solid solution and wherein the off-gas from the cooler is sent to the prefilter for filtering said off-gas to remove solids.

3. An apparatus for producing a vitric solid solution according to claim 1, wherein, at the outlet side of the melting furnace for a vitric solid solution melt, there are provided a heater for prevention of rapid cooling of containers filled with the vitric melt as well as a slow cooling chamber for the containers 24.

4. An apparatus for producing a vitric solid solution according to claim 1, wherein the melting furnace includes a container as a lower half for receiving said vitric melt.

* * * * *